(12) United States Patent
Borella et al.

(10) Patent No.: US 6,353,614 B1
(45) Date of Patent: Mar. 5, 2002

(54) METHOD AND PROTOCOL FOR DISTRIBUTED NETWORK ADDRESS TRANSLATION

(75) Inventors: Michael S. Borella, Naperville; David Grabelsky, Skokie; Ikhlaq Sidhu, Vernon Hills, all of IL (US); Brian D. Petry, San Diego, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/035,600

(22) Filed: Mar. 5, 1998

(51) Int. Cl.⁷ .......................... H04L 12/28; H04L 12/52

(52) U.S. Cl. ................... 370/389; 370/401; 370/474; 370/475; 709/238

(58) Field of Search ................. 370/351, 352, 370/353, 354, 355, 356, 389, 392, 474, 475, 476, 400, 401; 709/217, 218, 219, 238, 245, 223

(56) References Cited

U.S. PATENT DOCUMENTS

| | | | |
|---|---|---|---|
| 5,159,592 A | | 10/1992 | Perkins |
| 5,227,778 A | | 7/1993 | Vacon et al. |
| 5,526,489 A | * | 6/1996 | Nilakantan et al. ......... 709/228 |
| 5,550,984 A | | 8/1996 | Gelb |
| 5,636,216 A | | 6/1997 | Fox et al. |
| 5,708,655 A | | 1/1998 | Toth et al. |
| 5,793,763 A | | 8/1998 | Mayes et al. |
| 5,812,819 A | | 9/1998 | Rodwin et al. |
| 5,867,660 A | | 2/1999 | Schmidt et al. |
| 5,872,847 A | | 2/1999 | Boyle et al. |
| 6,011,782 A | * | 1/2000 | DeSimone et al. ......... 370/260 |
| 6,055,236 A | | 4/2000 | Nessett et al. |
| 6,157,950 A | * | 12/2000 | Krishnan .................... 709/223 |

OTHER PUBLICATIONS

Tsirtsis, George, O'Neill, Alan, Internet Engineering Task Force, Internet Draft, "NAT Bypass for End 2 End 'sensitive' applications", <draft–tsirtsis–nat–bypass–00.txt>, Jan. 1998, pp. 1 to 6.

(List continued on next page.)

*Primary Examiner*—Ajit Patel
*Assistant Examiner*—Bob A. Phunkulh
(74) *Attorney, Agent, or Firm*—McDonnell Boehnen Hulbert & Berghoff; Steven Lesavich

(57) ABSTRACT

A method and protocol for Distributed Network Address Translation ("DNAT") is provided. DNAT is used to overcome the limited address 32-bit address space used for versions of the Internet Protocol ("IP"). DNAT is used with small office or home office networks or other legacy local network that have multiple network devices using a common external network address to communicate with an external network. The protocol includes a port allocation protocol to allocate globally unique ports to network devices on a local computer network. The globally unique ports are used in a combination network address with a common external network address such as an IP address, to identify multiple network devices on a local network to an external network such as the Internet, an intranet, or a public switched telephone network. The method includes requesting one or more globally unique ports from network devices on a local network, receiving the ports, and replacing local ports with the globally unique ports. The network devices on the local network use the combination network address with the common external network address and the globally unique port to uniquely identify themselves during communications with an external network. DNAT overcomes the large computation burdens encountered when network address translation is done by a router for multiple network devices on a local network using a common external network address and simplifies routers since a router in a DNAT system does not have to support multiple individual protocols. DNAT helps extend the life of versions of IP using 32-bit addressing, allows a local network to efficiently switch between external network service providers and allows a local network to purchase a smaller block of external network addresses.

42 Claims, 10 Drawing Sheets

OTHER PUBLICATIONS

K. Egevang, and P. Francis, Internet Engineering Task Force, ("IETF"), Request for Comments ("RFC") RFC–1631, "The IP Network Address Translator (NAT)", May 1994, pp. 1–10.

W.T. Teo, S.W. Yeeow, R. Singh, Internet Engineering Task Force, Internet Draft, "IP Relocation Through Twice Network Address Translator," <draft–ietf–nat–rnat–00.txt>, Feb. 1999, pp. 1 to 20.

George Tsirtis, Pyda Srishuresh, Internet Engineering Task Force, Internet Draft, "Network Address Translation—Protocol Translation (NAT–PT), <draft–ietf–ngtrans–natpt–04.txt>," Jan. 1999, pp. 1 to 13.

P. Srisur, K. Egev, Internet Engineering Task Force, Internet Draft, "Traditional IP Network Address Translator (Traditional NAT)," <draft–ietf–nat–traditional–.01.txt>, Oct. 1998, pp. 1 to 17.

G. Montene, Internet Engineering Task Force, Internet Draft, "Negotiated Address Reuse" (NAR), <draft–montenegro–aatn–nar–00.txt>, May 1998, pp. 1 to 22.

P. Srisur, Matt Holdrege, Internet Engineering Task Force, Internet Draft, "IP Network Address Translator (NAT) Terminology and Consideration," <draft–ietf–nat–terminology–01.txt>, Oct. 1998, pp. 1 to 28.

Praveen Akkiraju, Yakov Rekhter, Internet Engineering Task Force, Internet Draft, "A Multihoming Solution Using NATs" <draft–akkiraju–nat–multihoming–00.txt>, Nov. 1998, pp. 1 to 32.

P. Sris, K. Eg, Internet Engineering Task Force, Internet Draft, "The IP Network Address Translator" (NAT), <draft–rfced–info–srisuresh–05.txt>, Feb. 1998, pp. 1 to 24.

W.T. Teo, S.W. Yeow, R. Singh, Internet Engineering Task Force, Internet Draft, "Reverse Twice Network Address Translators" (RAT), <draft–teoyeow–mip–rat–01.txt>, Dec. 1998, pp. 1 to 20.

Jeffrey Lo, K, Taniguchi, Internet Engineering Task Force, Internet Draft, "IP Host Network Address (and port) Translation," <draft–ietf–nat–hnat–00.txt>, Nov. 1998, pp. 1 to 13.

T. Hain, Internet Engineering Task Force, Internet Draft, "Architectural implications of NAT," <draft–iab–nat–implications–02.txt>, Oct. 1998, pp. 1 to 14.

Yakov Rekhter, Internet Engineering Task Force, Internet Draft, "Implications of NATs on the TCP/IP Architecture," <draft–ietf–nat–arch–implications–00.txt>, Feb. 1999, pp. 1 to 7.

P. Srisuresh, G. Tsirsis, P. Akkiraju, A. Heffernan, Internet Engineering Task Force, Internet Draft, "NDS Extensions to Network Address Translators" ($DNS_{13}$ ALG), <draft–ietf–nat–dns–01.txt>, Oct. 1998, pp. 1 to 24.

Michael Borella, David Grabelsky, Ikhlaq Sidhu, Brian Petry, Internet Engineering Task Force, Internet Draft, "Distributed Network Address Translation," <draft–borella–aatn–dnat–01.txt>, Oct. 1998, pp. 1 to 21.

P. Srisuresh, Internet Engineering Task Force, Internet Draft, "Security for IP Network Address Translator (NAT) Domains," <draft–ietf–nat–security–00.txt>, Nov. 1998, pp. 1 to 11.

R. G. Moskowitz, Internet Engineering Task Force, Internet Draft, "Network Address Translation Issues with IPsec," <draft–moskowitz–net66–vpn–00.txt>, Feb. 6, 1998, pp. 1 to 8.

R. Thay, N. Doraswa and R. Gle, Internet Engineering Task Force, Internet Draft, "IP Security," <draft–ietf–ipsec–doc–roadmap–02.txt.>, Nov. 1997, pp. 1 to 12.

W.T. Teo, Y. Li, Internet Engineering Task Force, Internet Draft, "Mobile IP Extension for Private Internet Support," <draft–teoyli–mobileip–mvpn–02.txt>, Feb. 1999, pp. 1 to 24.

Borella, Michael, *Technology Update—Protocol Helps Stretch IPv4 Addresses*, "Network World", Vol. 17, No. 3, Jan. 17, 2000, p. 43.

* cited by examiner

PORT ALLOCATION PROTOCOL (PAP)

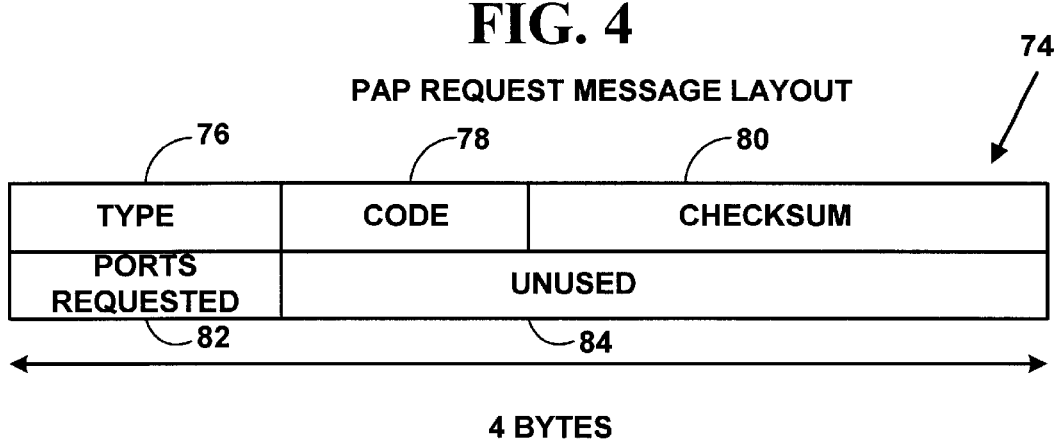
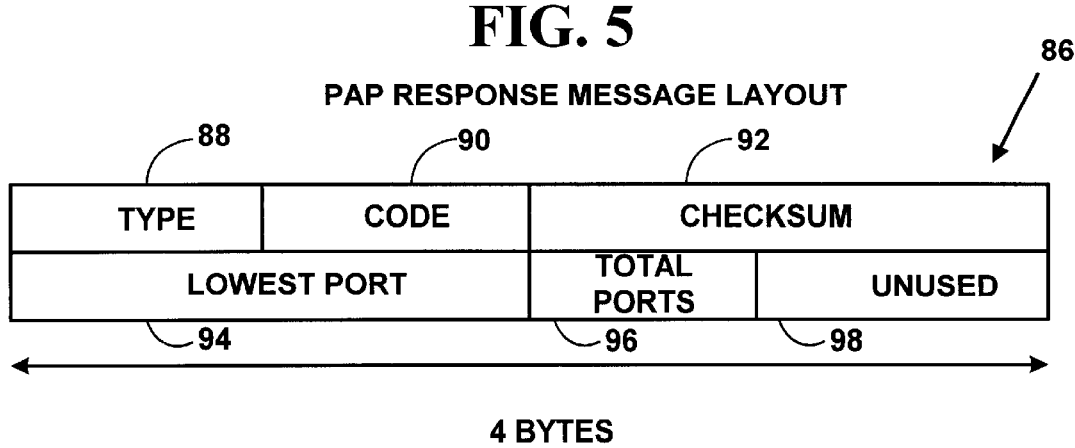
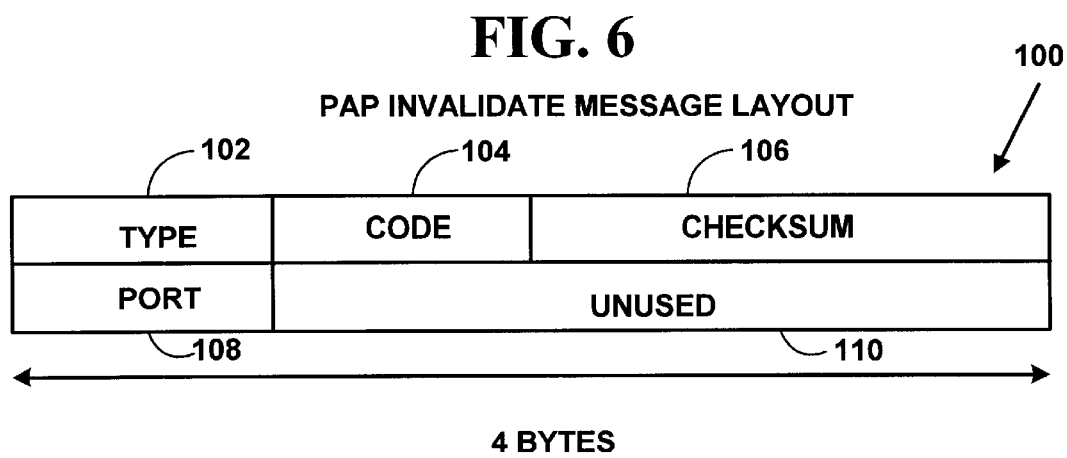

PORT-TO-INTERNAL-NETWORK
ADDRESS TABLE

FIG. 11
SOURCE PORT TRANSLATION TABLE (SPTT)

| LOCAL PORT | GLOBAL PORT |
|---|---|
| PROTOCOL | TIMESTAMP |

FIG. 12
IP ADDRESS TRANSLATION TABLE (IPATT)

| DESTINATION PORT | INTERNAL DESTINATION IP ADDRESS |
|---|---|
| PROTOCOL | TIMESTAMP |

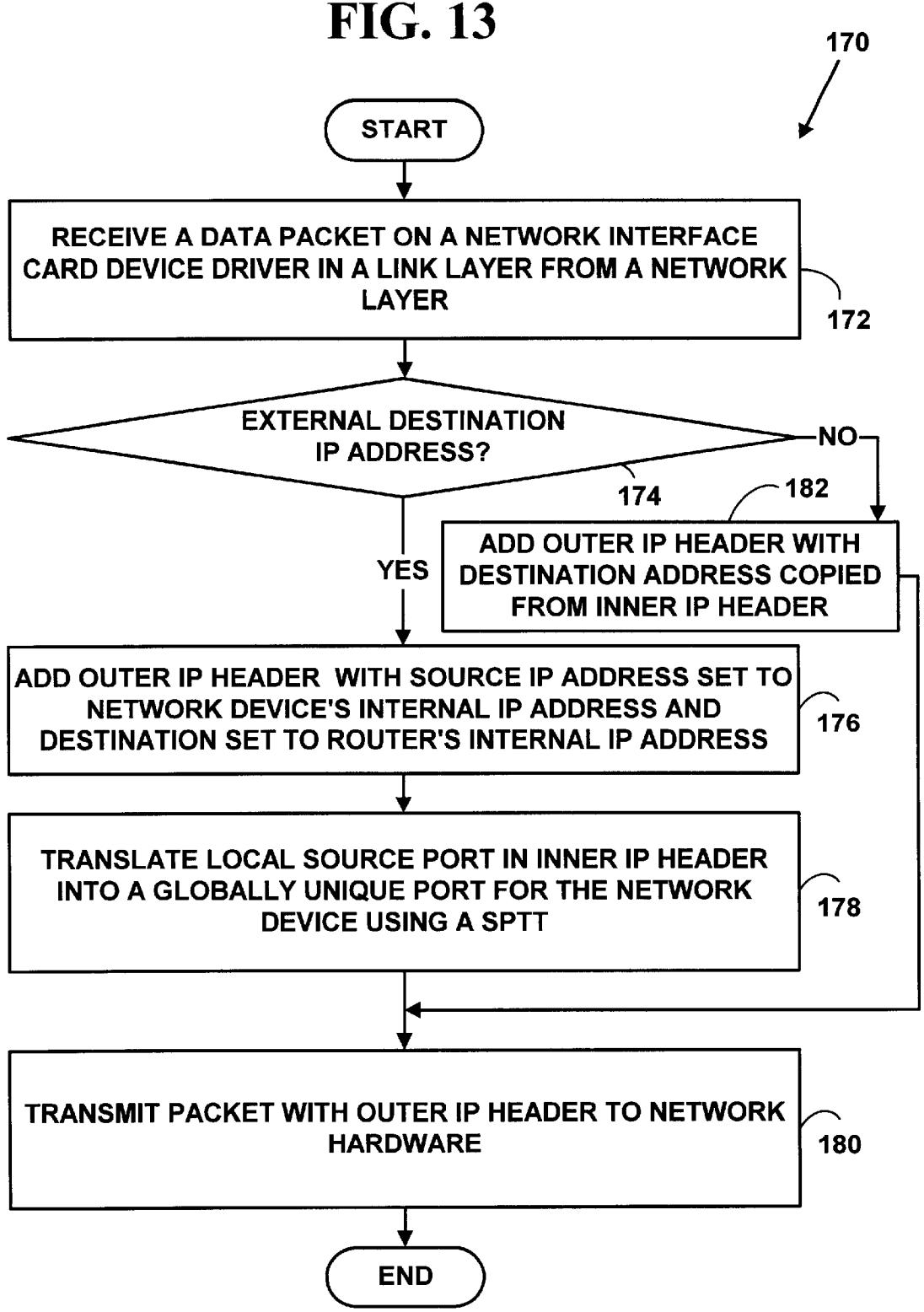

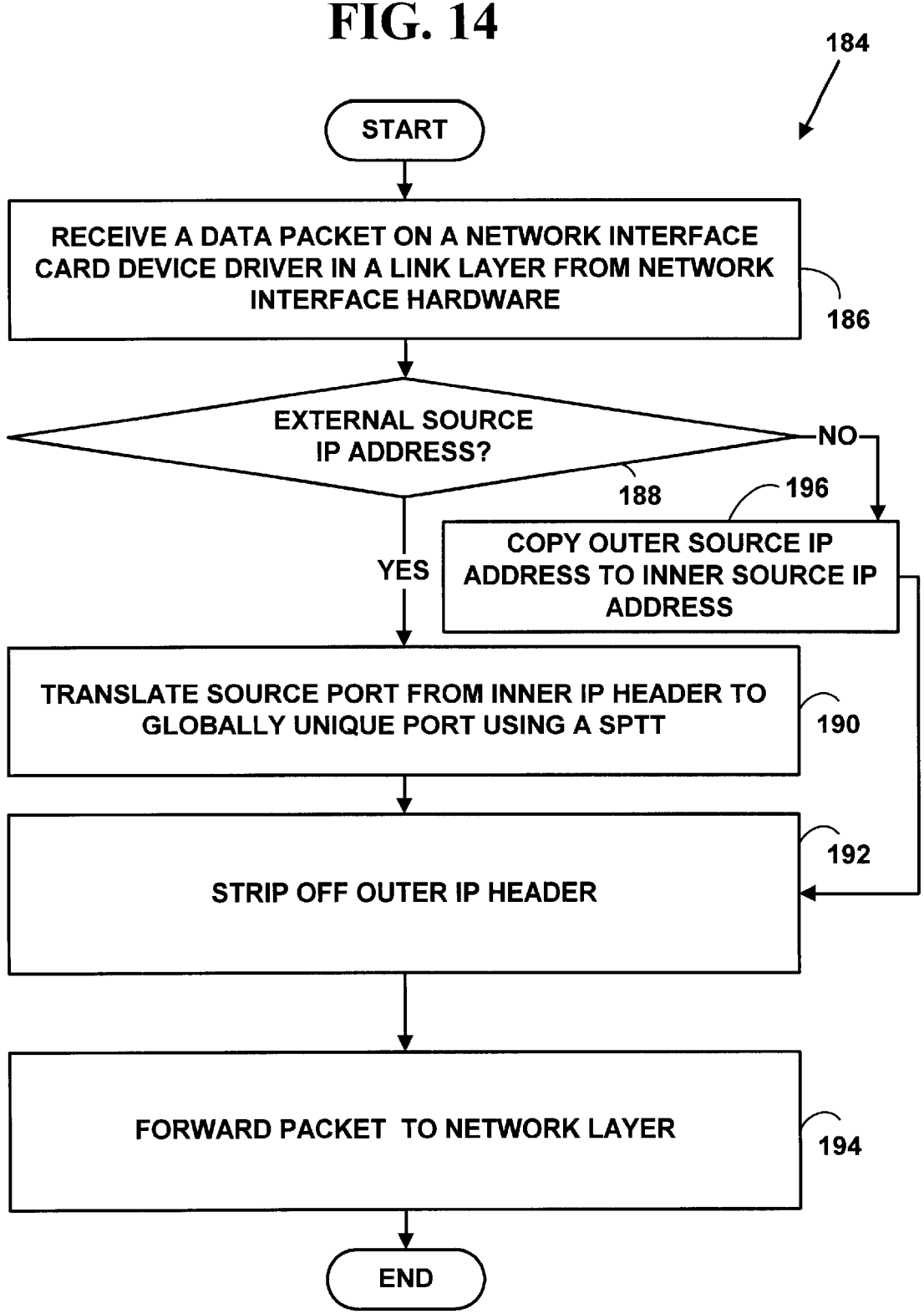

METHOD AND PROTOCOL FOR DISTRIBUTED NETWORK ADDRESS TRANSLATION

FIELD OF INVENTION

This invention relates to computer networks. More specifically, it relates to a method and system for distributed network address translation on computer networks.

BACKGROUND OF THE INVENTION

The Internet Protocol ("IP") is an addressing protocol designed to route traffic within a network or between networks. Current versions of IP such as IP version 4 ("Ipv4") are becoming obsolete because of limited address space. With a 32-bit address-field, it is possible to assign $2^{32}$ different addresses, which is 4,294,967,296, or greater than 4 billion possible addresses. A unique IP number is typically assigned to network devices and a network using IP, whether or not the network is connected to the Internet. Most organizations, such as corporations and universities have multiple networks using IP, with multiple network devices assigned an IP address. With the explosive growth of the Internet and intranets, IP addresses using a 32-bit address-field may soon be exhausted. IP version 6 ("Ipv6") proposes the use of a 128-bit address-field for IP addresses. However, a large number of legacy networks including a large number of Internet nodes will still be using older versions for IP with a 32-bit address space for many years to come.

Network address translation ("NAT") has been proposed to extend the lifetime of Internet Protocol ("IP") version 4 ("Ipv4") and earlier versions of IP by allowing a small home office or small network to exist behind a single IP address. The single IP address is used for communication with external networks such as the Internet. Internally, the small home office or small network uses private addressing. When a device or node using private addressing desires to communicate with the external world, a private address is translated to a common IP address used for communication with an external network by a NAT device.

There are several problems associated with using NAT to extend the life of IP. NAT interferes with the end-to-end routing principal of the Internet that recommends that packets flow end-to-end between network devices without changing the contents of any packet along a transmission route. (see e.g., Routing in the Internet, by C. Huitema, Prentice Hall, 1995) Current version's of NAT replace a private network address in a data packet header with an external network address on outbound traffic, and replace an external address in a data packet header with a private network address on inbound traffic. This type of address translation is computationally expensive, causes security problems by preventing certain types of encryption from being used, or breaks a number of existing applications in a network that cannot do NAT (e.g., File Transfer Protocol ("FTP")).

Current versions of NAT may not gracefully scale beyond a small network containing a few dozen nodes or devices because of the computational and other resources required. NAT potentially requires support for many different internal network protocols be specifically programmed into a translation mechanism for external protocols in a NAT device such as a NAT router. As is known in the art, a router translates differences between network protocols and routes data packets to an appropriate network node or network device. Computational burdens placed on a NAT router may be significant and degrade network performance, especially if several NAT-enabled stub networks share the same NAT router. In a worst case scenario, a NAT router translates every inbound and outbound data packet.

As is known in the art, Transmission Control Protocol ("TCP") and User Datagram Protocol ("UDP") are often used over IP in computer networks. TCP provides a connection-oriented, end-to-end reliable protocol designed to fit into a layered hierarchy of protocols that support multi-network applications. UDP provides a transaction oriented datagram protocol, where delivery and duplicate packet protection are not guaranteed. When NAT is used to translate a TCP/IP or UDP/IP data packet, the packet's IP, TCP or UDP checksums are recalculated. When a port in a TCP or UDP header is translated, the packet's TCP or UDP checksum are also recalculated. This further increases the computational cost of translation in a NAT router.

When an IP address or port is translated with NAT, a new length may result for the data packet and a possible change in a TCP sequence number. A running sequence number offset (i.e., a delta) must then be maintained throughout the remainder of the connection. This delta must be applied to a future traffic, including acknowledgment numbers further increasing computational time in a NAT router.

In addition to TCP or UDP, a NAT router must be able to translate addresses, ports, change lengths and maintain sequence numbers for a number of different protocols that may transmit an IP address or port number (e.g., FTP, H.323, H.324, CUSeeME, RealAudio, Internet Relay Chat and others). Thus, it is desirable to provide NAT without large computational burdens in a NAT router.

SUMMARY OF THE INVENTION

In accordance with preferred embodiments of the present invention, some of the problems associated with NAT are overcome. A method and protocol for Distributed Network Address Translation ("DNAT") is provided. The protocol includes a Port Allocation Protocol ("PAP") for allocating globally unique port numbers for a network device. A globally unique port is unique on a local network and used with a common external network address to identify multiple devices to a second external network. Thus, one external network address can be used without network address translation to service multiple network devices on an internal network.

The method and protocol distribute network address translation by requesting a network device obtain globally unique port for all external communications. The network device replaces local or default ports with the globally unique ports. The network device uses a combination network address (e.g., common external network address/ globally unique port number) for communications with network devices on a second external network. The method and protocol distribute network address translations to individual network devices on a network and remove the computation burden of NAT from a router. A NAT router is no longer required to support multiple individual protocols for the network address translation process.

In addition, DNAT may allow a local network with a common external network address to easily switch from a first network service provider to a second network service provider by replacing the common external network address assigned to the local network. DNAT may also allow an entity to purchase a smaller block of IP addresses, which are becoming very expensive, and use a single or a smaller number of IP addresses as a common external network address.

BRIEF DESCRIPTION OF THE DRAWINGS

FIG. 4 is a block diagram illustrating a PAP request message layout;

FIG. 5 is a block diagram illustrating a PAP response message layout;

FIG. 6 is a block diagram illustrating a PAP invalidate message layout;

FIG. 11 illustrates a source port transition table layout;

FIG. 12 illustrates an Internet Protocol address translation table layout;

FIG. 13 illustrates a method for outbound distributed network address translation using port translation; and FIG. 14 illustrates a method for inbound distributed network address translation using port translation.

DETAILED DESCRIPTION OF PREFERRED EMBODIMENTS

Figure 1:
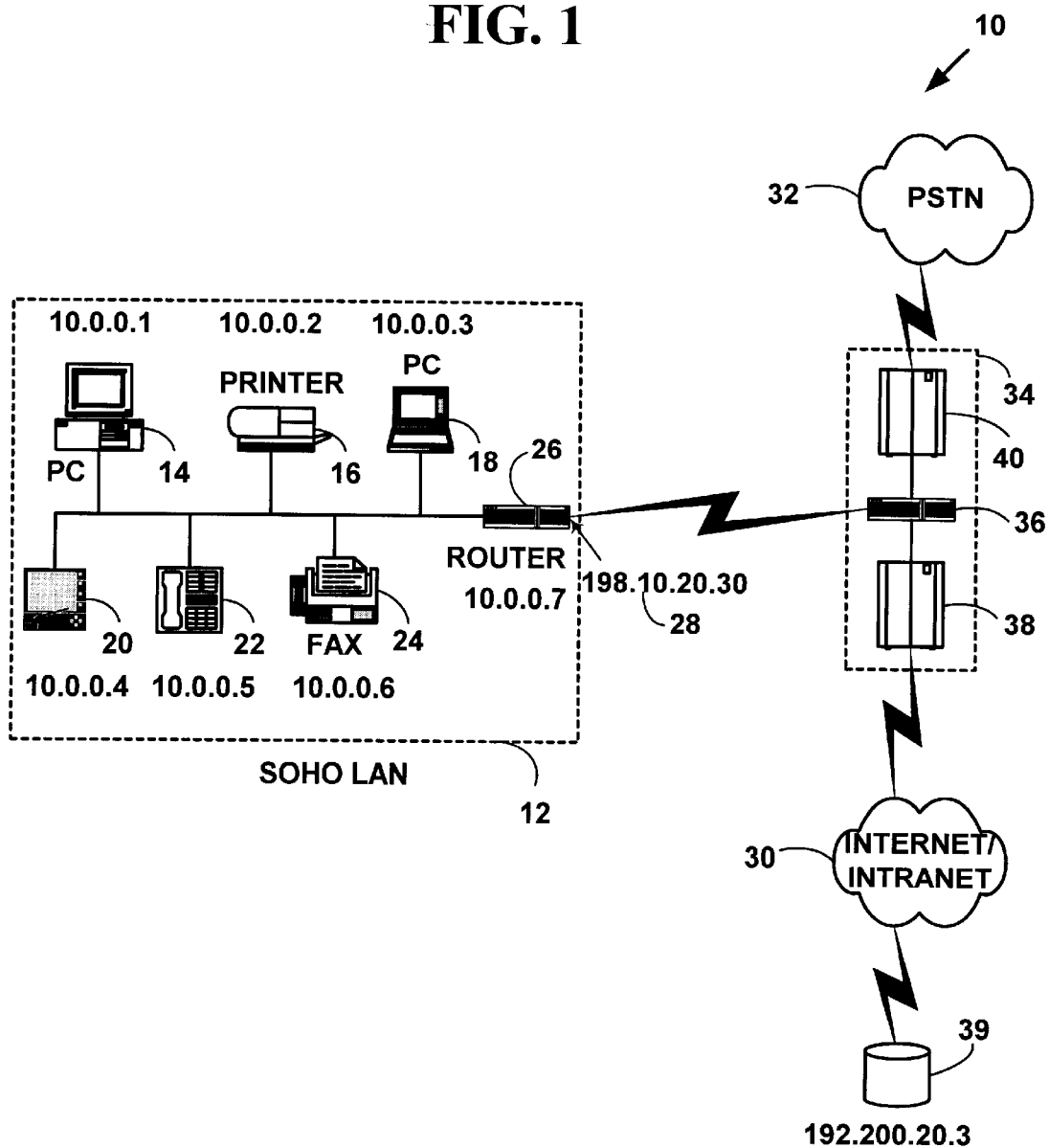
FIG. 1 is a block diagram illustrating a network system for distributed address translation.

FIG. 1 is a block diagram illustrating a network system 10 for an illustrative embodiment of the present invention. Network system includes a first computer network 12 with multiple network devices (14, 16, 18, 20, 22, 24) and a router 26 to route data packets to another external computer network. The multiple network devices include any of computers (14, 18), printers 16, facsimile devices 24, hand-held devices 20, telephones 22 or other network devices not illustrated in FIG. 1. First computer network 12 has a external common network address 28 (e.g., an IP address 198.10.20.30) to identify first network 12 to an external computer network such as a second computer network 30 and/or a third computer network 32 external to first computer network 12. The multiple network devices (14, 16, 18, 20, 22, 24, 26) have an internal network address for first computer network 12 (e.g., 10.0.0.x explained below). A network access service provider 34 with a router 36 routes data packets to/from first computer network 12 to second computer network 30 and/or third computer network 32 through a second network switch 38 and/or a third network switch 40. In one embodiment of the present invention, first network 12 is a Small Office/Home Office ("SOHO") Local Area Network ("LAN"), also called a "legacy" LAN, second network 30 is the Internet or an intranet, and third network 32 is a Public Switched Telephone Network ("PSTN"). However, other network types and network components can also be used and the present invention is not limited to the network types and network components described for an illustrative embodiment.

An operating environment for network devices and router of the present invention include a processing system with at least one high speed Central Processing Unit ("CPU") and a memory. In accordance with the practices of persons skilled in the art of computer programming, the present invention is described below with reference to acts and symbolic representations of operations that are performed by the processing system, unless indicated otherwise. Such acts and operations are referred to as being "computer-executed" or "CPU executed."

It will be appreciated that acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

In network address translation schemes known in the prior art, router 26 translates an internal network address such as an internal IP address used on first network 12 to an external network address such as an IP address for outgoing traffic to second network 30 or third network 32. Router 26 also translates an external network address to an internal network address for incoming traffic from second network 30 or third network 32. A NAT router assumes the entire computation burden for network address translation. For large stub networks for 50 or more network devices, the NAT router becomes a bottleneck. In the worst case, every packet passing through the NAT router will require address translation.

In an illustrative embodiment of the present invention, Distributed Network Access Translation ("DNAT") is used. Network devices (14, 16, 18, 20, 22, 24) on first computer network 12 request a set of globally unique ports from router 26 for external communications with external second network 30 or third network 32. Network devices (14, 16, 18, 20, 22, 24) replace local or default ports with the globally unique ports and use a combination network address including the globally unique port and a common external network address (e.g., an IP address) for communications with the external networks 30 and 32.

DNAT Protocol Stack

Figure 2:
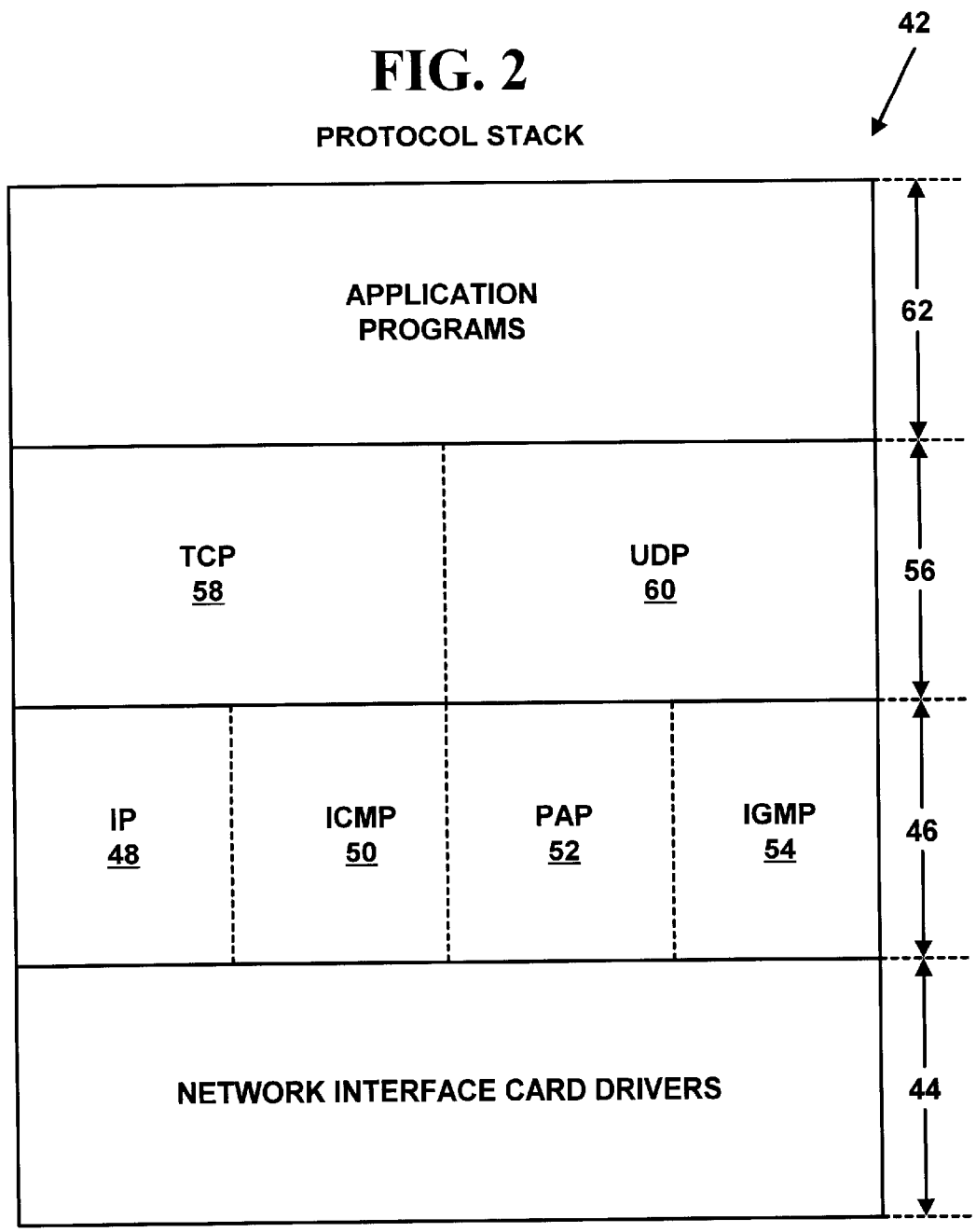
FIG. 2 is a block diagram illustrating a protocol stack for a network device.

FIG. 2 is a block diagram illustrating a layered protocol stack 42 for a network device from first network 12 used for DNAT. Layered Protocol stack 42 is described with respect to Internet Protocol suites comprising from lowest-to-highest, a link, network, transport and application layer. However, more or fewer layers could also be used, and different layer designations could also be used for the layers in protocol stack 42 (e.g., layering based on the Open Systems Interconnection ("OSI") model).

Network devices (14, 16, 18, 20, 22, 24) are connected to first network 12 with a link layer 44. Link layer 44 includes Network Interface Card ("NIC") drivers for the hardware network devices connecting the network devices to computer network 12. Above link layer 44 is a network layer 46. Network layer 46, includes an IP layer 48. As is known in the art, IP 48 is an addressing protocol designed to route traffic within a network or between networks. IP layer 48, hereinafter IP 48, is described in Internet Engineering Task Force ("IETF") Request For Comments ("RFC") RFC-791, incorporated herein by reference.

In addition to IP 48, three other protocol layers are used in network layer 46: Internet Control Message Protocol ("ICMP") layer 50, Port Allocation Protocol ("PAP") layer 52 and Internet Group Management Protocol ("IGMP") 54 layer. However, more or fewer protocols could also be used.

ICMP layer 50, hereinafter ICMP 50, is used for network management. The main functions of ICMP 50 include error reporting, reachability testing (e.g., "pinging") congestion control, route-change notification, performance, subnet addressing and other maintenance. For more information on ICMP 50 see RFC-792, incorporated herein by reference.

PAP layer 52 allocates globally unique ports to a network device. In one embodiment of the present invention, PAP layer 52, is a separate protocol layer in network layer 46. In another embodiment of the present invention, PAP layer 52 is implemented as part of ICMP layer 50 and is not a separate protocol layer. PAP layer 52 is explained below.

IGMP layer 54, hereinafter IGMP 54, is responsible for User Datagram Protocol ("UDP") broadcasting or multicasting, such as sending UDP packets to an IP 48 device or to multiple IP devices on a network. IGMP 54 can also be used with a Transmission Control Protocol. For more information on IGMP 54 see RFC-1 112, incorporated herein by reference.

Above network layer 46 is a transmission layer 56. Transmission layer 56 includes a Transmission Control Protocol ("TCP") layer 58 and a UDP layer 60. TCP layer 58, hereinafter TCP 58, provides a connection-oriented, end-to-end reliable protocol designed to fit into a layered hierarchy of protocols which support multi-network applications. TCP 58 provides for reliable inter-process communication between pairs of processes in network devices attached to distinct but interconnected networks. For more information on TCP 58 see RFC-793, incorporated herein by reference.

UDP layer 60, hereinafter UDP 60, provides a connectionless mode of communications with datagrams in an interconnected set of computer networks. UDP 60 provides a transaction oriented datagram protocol, where delivery and duplicate packet protection are not guaranteed. For more information on UDP 60 see RFC-768, incorporated herein by reference.

Both TCP 58 and UDP 60 are not required in protocol stack 52. Either TCP 58 or UDP 60 can be used without the other. If only TCP 58 is used, then IGMP 54 and UDP 60 may be removed from protocol stack 42. If only UDP 60 is used, IGMP 50 and TCP 58 may be removed from protocol stack 42. However, UDP 60 can also be used with ICMP 50 and IGMP 54 without TCP 50.

Above transmission layer 56 is an application layer 62 where application programs to carry out desired functionality for a network device reside. For example, the application programs for network device 16 include printer application programs, while application programs for network device 24 include facsimile application programs. However, more or fewer protocol layers can also be used in protocol stack 42.

DNAT Protocol

Figure 3:
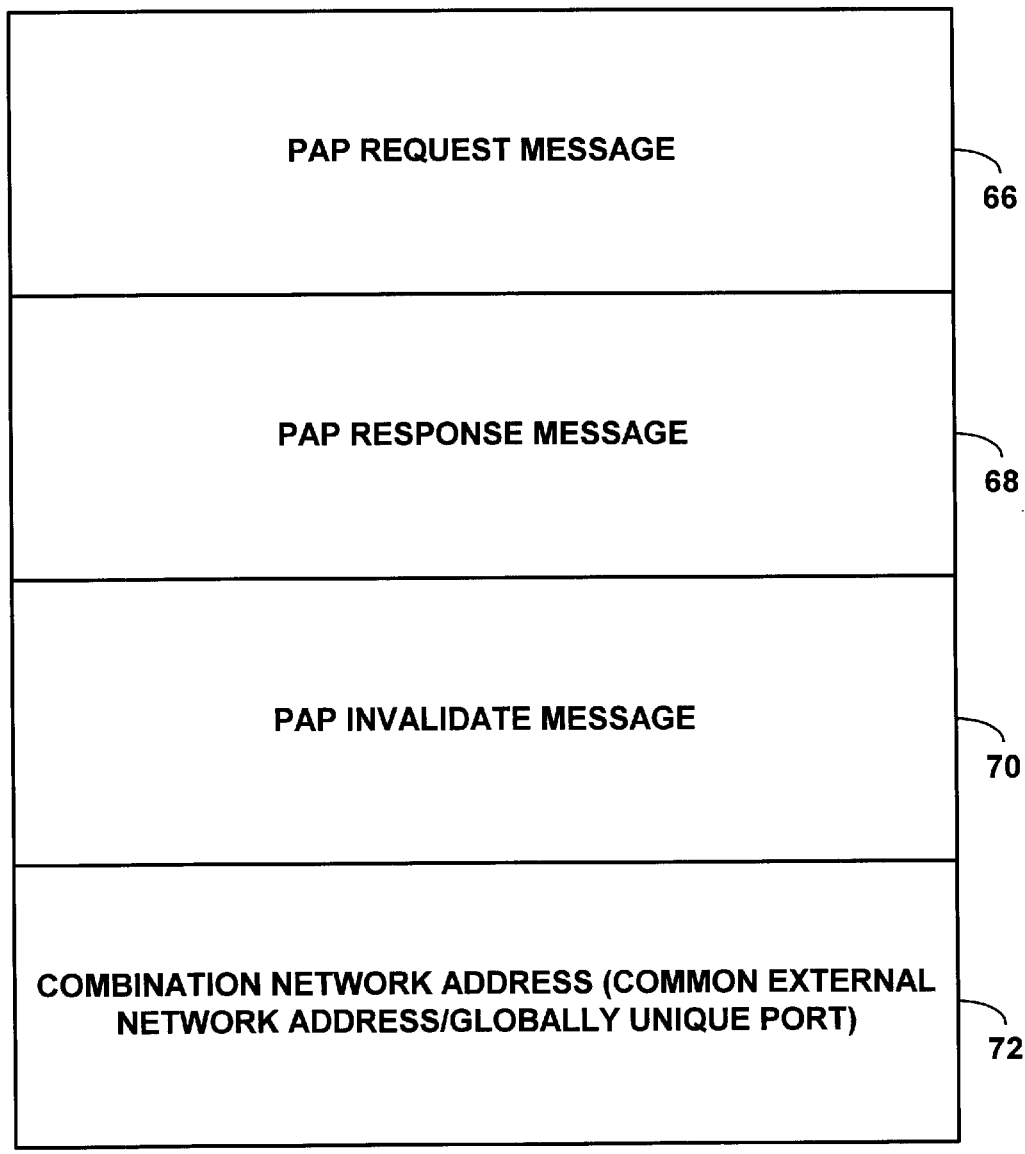
FIG. 3 is a block diagram illustrating a port allocation protocol ("PAP")

FIG. 3 is a block diagram illustrating a Port Allocation Protocol ("PAP") 64. PAP 64 is implemented in a separate PAP layer 54 or as an integral part of ICMP 50 in protocol stack 42 (FIG. 2). PAP 64 includes a PAP request message 66, a PAP response message 68, a PAP invalidate message 70 and a combination network address 72. Fields in the PAP messages (66, 68, 70) follow standard ICMP 50 message format. However, other message layouts (i.e., Non-ICMP 50 message format) and more or fewer messages could also be used for PAP 64 messages.

In a illustrative embodiment of the present invention, PAP request message 66 is sent from network device (14,16,18, 20, 22, 24) to router 26 to request a block of globally unique port numbers. In another embodiment of the present invention, PAP 64 is used with another network device (e.g., a port server or other network device separate from router 26). FIG. 4 is a block diagram illustrating a PAP request message layout 74. Type-field 76 is one-byte and has a pre-determined value (e.g., 32). Code-field 78 is one-byte and has a value of zero for ports under 10,000 and a value of 128 for ports above 10,000. Checksum-field 80 is two-bytes, and has a value of a 1's complement sum of the entire PAP request message 66 layout 74. As is known in the art, a 1's complement for a value written in binary or base-2 (i.e., has only zero's and one's) is the inverse of a existing one or zero. For example, a 1's compliment of $110_2$ is $001_2$.

Ports-requested-field 82 is one-byte and has a variable value indicating a number of globally unique ports requested by a network device. By default ports-requested-field 82 is 16 or 32, which is a reasonable number for most network devices. However, other default numbers could also be used. Unused-field 84 is three-bytes and has a value of zero. However, other layouts, values and field sizes could also be used for PAP request message 66.

In one embodiment of the present invention, a network device transmits PAP request message 66 upon boot. In such an embodiment, PAP 64 can be associated with Dynamic Host Configuration Protocol ("DHCP") or BOOTstrap Protocol ("BOOTP"). DHCP is a protocol for passing configuration information such as IP 48 addresses to hosts on an IP 48 network. For more information on DHCP see RFC-1 541, incorporated herein by reference. The format of DHCP messages is based on the format of BOOTP messages described in RFC-951 and RFC-1 542, incorporated herein by reference. From a network device's point of view, DHCP is an extension of the BOOTP mechanism.

In another embodiment of the present invention, network devices (14, 16, 18, 20, 22, 124) request globally unique ports after boot when a protocol layer in layered protocol stack 42 makes an initial request for an external network (e.g., 30 or 32). Network devices (14, 16, 18, 20, 22, 24) may also request globally unique ports when the number of globally unique ports required falls below the number of globally unique ports allocated.

PAP request message 66 is sent from a network device (14, 16, 18, 20, 22, 24) to router 26 after attaching an IP 48 header or other message header. A PAP response message 68 is sent from router 26 back to network devices (14, 16, 18, 20, 22, 24) either confirming or denying PAP request message 66.

FIG. 5 is a block diagram illustrating a PAP response message layout 86. Type-field 88 is one-byte and has value pre-determined value (e.g., 32). Code-field 90 is one-byte and has a value of zero for failure and one for success. Checksum-field 92 is two-bytes is a 16-bit 1's complement sum of the entire PAP response message 68. Lowest-port-field 94 is two-bytes and is the lowest globally unique port number allocated in a block of globally unique ports. Total-ports-field 96 is one-byte and is the total number of globally unique ports allocated to the network device. Unused-field 98 is one-byte and has a value of zero. However, other layouts, values and field sizes could also be used for PAP response message 68.

Upon receiving a successful PAP response message 68, a network device saves the block of globally unique ports that it may use. The globally unique ports are saved in a data structure with a flag-field indicating whether the globally unique port is allocated or unused. Table 1 is pseudo-code for an exemplary data structure to store globally unique port information. However, other data structures or layouts could also be used.

TABLE 1

```
struct globally_unique_ports
{
    int port_number;
    flag status:1; /* one bit flag, 0 = unused, 1 = allocated */
} gu_ports[MAX_GU];
int number_of_gu_ports; /* number of globally unique ports allocated */
```

The one or more globally unique ports are allocated to protocols and applications in layered protocol stack 42 on a network device to replace local or default ports. Upon receiving an unsuccessful PAP response message 68 the network device may send another PAP request message 66 for fewer ports. If router 26 cannot allocate a large enough block of contiguous globally unique ports for the network device, it may send a PAP response 68 with a success code, but allocate fewer globally unique ports than requested.

FIG. 6 is a block diagram illustrating a PAP invalidate message layout 100. A PAP invalidate message 70 is used to invalidate or de-allocate a block of globally unique ports currently allocated to a network device. Type-field 102 is one-byte and has a pre-determined value (e.g., 32). Code-field 104 is one-byte and has a value of two. Checksum-field 106 is two-bytes and is a 1's complement sum of the entire PAP invalidate message 72. Port-field 108 is one-byte and has a value of a globally unique port number used by the network device. Unused-field 110 is three-bytes and has a value of zero. However, other layouts, values and field sizes could also be used for PAP invalidate message 70.

It is possible that two network devices may be allocated overlapping blocks of globally unique port numbers as a result of router 26 crash or reboot. Router 26 should send PAP invalidate messages 70 to invalidate all globally unique ports in use upon reboot to help prevent this problem. A network device (14, 16, 18, 20, 22, 24) also sends a PAP invalidate message 70 when it no longer needs a globally unique port.

Figure 7:
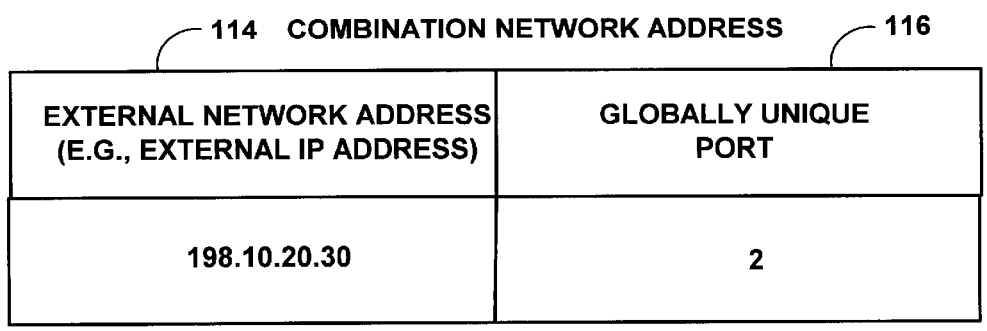
FIG. 7 is a block diagram illustrating a PAP combined network address layout.

FIG. 7 is a block diagram illustrating a combined network address layout 112 for combined network address 72. However, other layouts could also be used. Combined network address layout 112 includes a common external network address 114 such as an IP 48 address (e.g., common network address 28), and a globally unique port 116 obtained by sending a PAP request message 66 and receiving a PAP response message 68 from a network device. Network devices (14, 16, 18, 20, 22, 24) use combined network address 72 for communications with external second network 30 or third network 32. Common external network address 114 identifies first computer network 12 to an external second computer network (e.g., 30 or 32).

As is known in the art, to identify separate data streams, TCP 58 provides a source port field and a source address field in a TCP header. For more information on TCP headers see RFC-793. Since local or default port identifiers are selected independently by each TCP 58 stack in a network, they are typically not unique. To provide for unique addresses within each TCP 58, a local Internet address identifying TCP 58 can be concatenated with a local port identifier and a remote Internet address and a remote port identifier to create a "socket" that will be unique throughout all networks connected together. Sockets are known to those skilled in the networking arts.

In an illustrative embodiment of the present invention, the source port in a header is given a globally unique port obtained with PAP 64 and given a common external network address. Together they uniquely identify applications and protocols on network devices (14, 16, 18, 20, 22, 24) on first computer network 12 to second external computer network (e.g., 30 or 32) with a value conceptually similar to the socket used by TCP 58.

As is also known in the art, UDP 60 also has a source port field in a UDP header. For more information on UDP 60 headers see RFC-768. The UDP 60 source port is an optional field, when used, it indicates a port of the sending process, and may be assumed to be the port to which a reply should be addressed in the absence of any other information. If not used, a value of zero is inserted. A UDP 60 header also has a source address field. A globally unique port can also be used in a UDP 60 header.

In an illustrative embodiment of the present invention, PAP 64 is used to create combination network address 72 that is used in TCP 58, UDP 60 header fields. In another embodiment of the present invention, the combination network address 72 is stored in other message header fields understood by router 26 (i.e., non-IP 48 TCP 58 or UDP 60 fields), first computer network 12, second computer network 30 and third computer network 32.

In an illustrative embodiment of the present invention, router 26 allocates blocks of globally unique ports to network devices (14,16,18, 20, 22, 24). However, other network devices could also be used to allocate globally unique ports (e.g., a port server). Router 26 maintains a port-to-internal network address table as globally unique parts are allocated. Router 26 also has an internal table indicating internal network addresses for all network devices (14, 16, 18, 20, 22, 24) on first computer network 12. In an illustrative embodiment of the present invention, the internal network addresses for first computer network 12 are IP 48 addresses. For example, computer 14 has an internal IP address of 10.0.0.1 (FIG. 1), printer 16, 10.0.0.2, computer 18, 10.0.0.3, hand held computer, 20, 10.0.0.4, telephone 22, 10.0.0.5, facsimile, 24, 10.0.0.6, and router 26, 10.0.0.7 in FIG. 1. The internal addresses are not published on the external computer network (e.g., the Internet or an intranet). However, other internal network addresses could also be used (e.g., a Medium Access Control ("MAC") protocol addresses).

Figure 8:
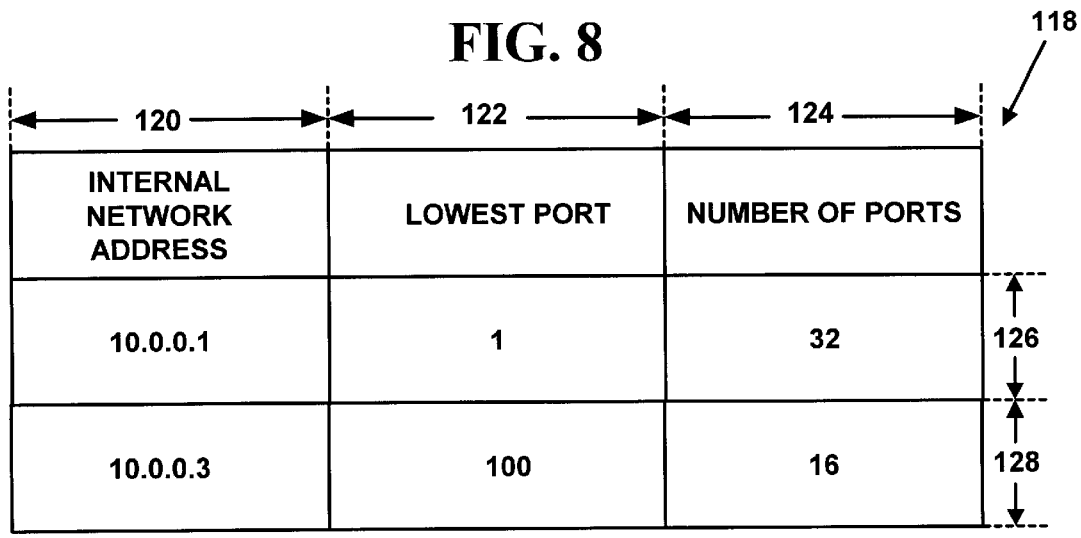
FIG. 8 is a block diagram illustrating a PAP port-to-internal network address table layout.

FIG. 8 is a block diagram illustrating a port-to-internal address table 118 layout maintained by router 26. However, other layouts and more or fewer rows and columns could also be used could also be used. Port-to-internal address table 118 layout has three columns: an internal-network-address column 120, a lowest-port column 122, and a number-of-ports column 124. However, more or fewer columns or other table layouts could also be used. First row 126 indicates that a network device has been allocated ports 1–32 for use with internal network address 10.0.0.01 (e.g., computer 14). A second network device has been allocated ports 100–116 for use with internal network address 1.0.0.3 (e.g., computer 18). An internal network address may have several entries in port-to-internal address table 118.

Distributed Network Address Translation

Figure 9:
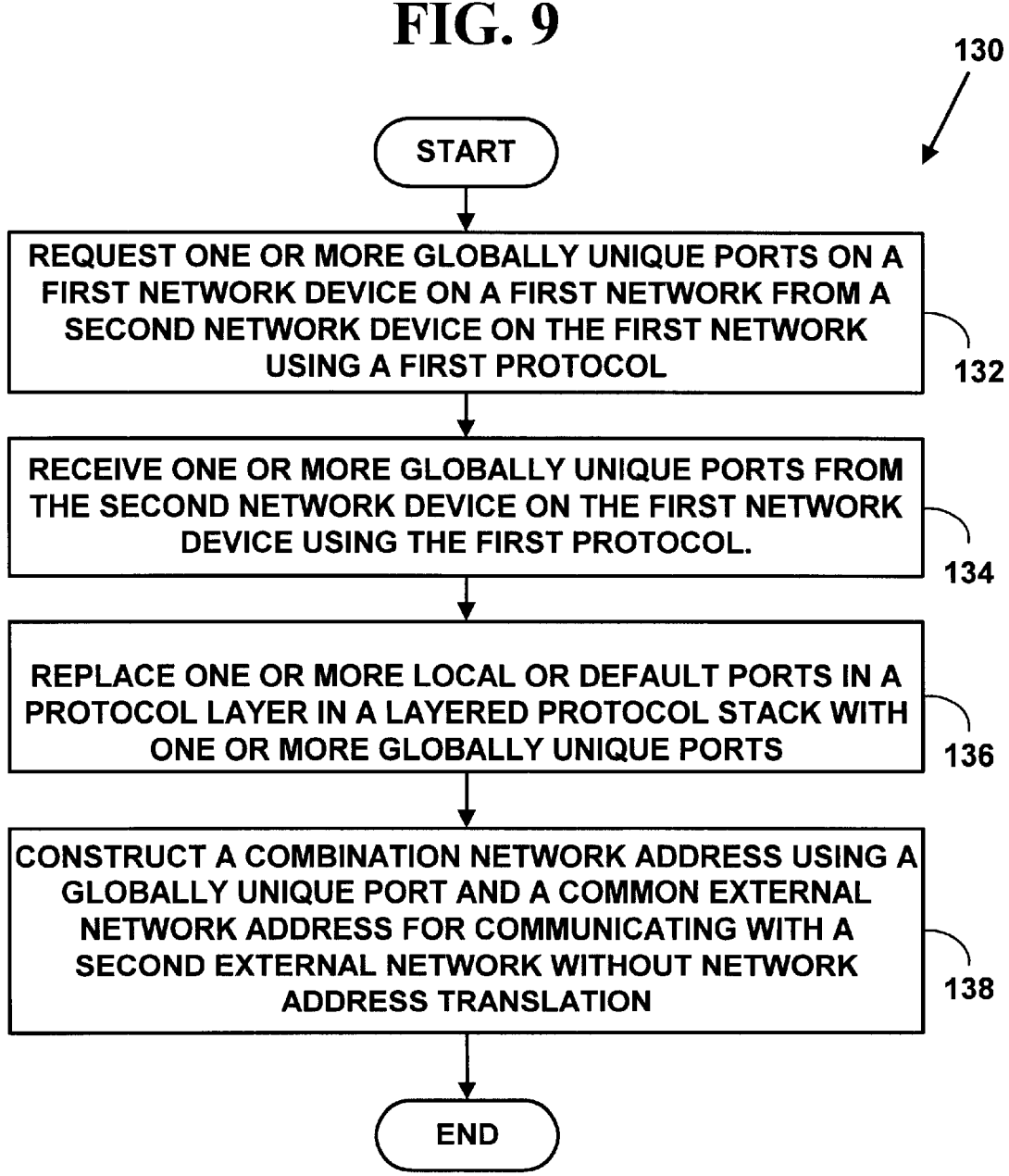
FIG. 9 is a flow diagram illustrating a method for allowing distributed network address translation.

FIG. 9 is a flow diagram illustrating a method 130 for allowing distributed network address translation. At step 132, a first network device on a first computer network requests one or more globally unique ports from a second network device on the first computer network with a first protocol. The globally unique ports are used to replace default ports in protocol layers in layered protocol stack 42 on the first network device. In addition, the globally unique ports are used to create a combination network address comprising a globally unique port and a common external address to communicate with a second external computer network without address translation. At step 134, the first network device receives the one or more globally unique ports from the second network device. At step 136, the first network device replaces one or more local or default ports used in layered protocol stack 42 with one or more globally unique ports. At step 138, the first network device constructs one or more combination network addresses using the one or more globally unique ports and a common external network address used to identify the first computer network on the second external computer network.

In an illustrative embodiment of the present invention, the first network device is any of network devices (14, 16, 18, 20, 22, 24), the second network device is router 26, the first computer network is first computer network 12 (e.g., SOHO LAN) the first protocol is PAP 64, the second external computer network is any of second computer network 30 (e.g., the Internet or an intranet) or third computer network 32 (e.g., PSTN). The combination network address includes a common IP 48 address (e.g., common network address 28) identifying network devices on first computer network 12 to a second external computer network (e.g., 30 or 32). However, the present invention is not limited to the networks, network devices, network addresses or protocols described and others may also be used.

The globally unique ports are used for entities such as protocols and applications in layered protocol stack 42 on network device and are globally unique on first computer network 12. The globally unique ports will identify a network device on first computer network 12. For example, TCP 58 typically has a default source port assigned to the TCP stack (e.g., 1234). After allocation with method 130, a network device uses a globally unique port to replace a default or local port in a protocol layer in layered protocol stack 42. As is illustrated in FIG. 8, network device 14 with internal IP 48 address 10.0.0.1 is assigned thirty-two globally unique ports in the rage of 1–32. Network device 14 may assign globally unique port-2 to TCP 58 to use as a source port. The original default port for TCP 58 was 1234. Combination network address 112 illustrated in FIG. 7 is then assigned to TCP 58 on network device 14 for communications with an external network (e.g., 30 or 32). Other globally unique ports are assigned to other protocols and applications in layered protocol stack 42 on a network device to replace other local ports.

In one embodiment of the present invention, globally unique ports are assigned to protocol layers in layered protocol stack 42 when a network device boots. In another embodiment of the present invention, globally unique ports are assigned to protocol layers in layered protocol stack 42 when a protocol layer makes a request for an external network (e.g., 30 or 32). In yet another embodiment of the present invention, globally unique ports are assigned dynamically or on-the-fly in an individual protocol layer as a protocol layer makes a request for an external network (e.g., 30 or 32).

The globally unique ports with common external network address 28 as combination network address 112 uniquely identify an entity on a network device to an external network (e.g., 30 or 32) without translation. Network interface card device drivers in link layer 44 maintain the actual internal IP 48 address of a network device.

Figure 10:
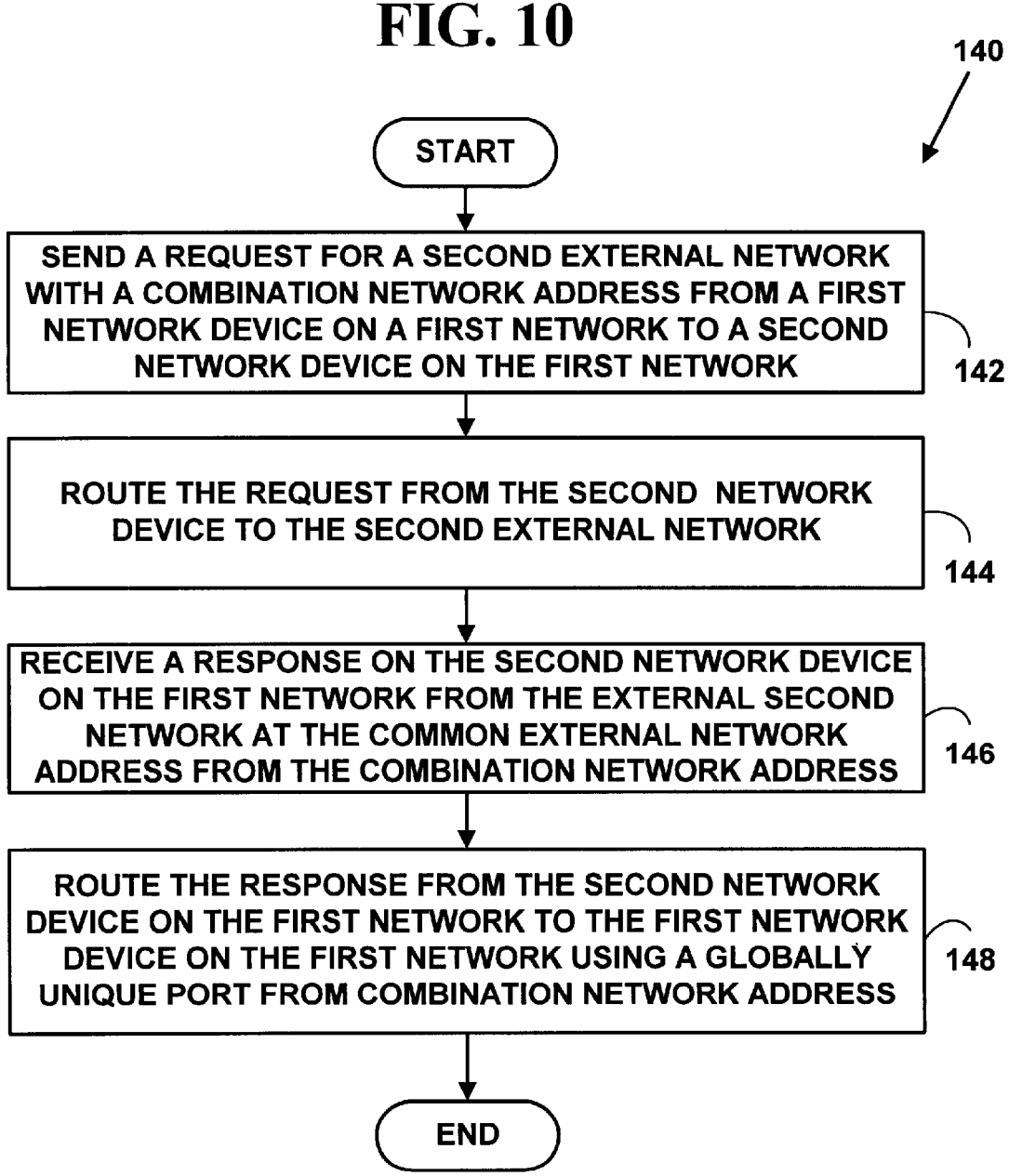
FIG. 10 is a flow diagram illustrating a method for distributed network address translation.

FIG. 10 is a flow diagram illustrating a method 140 for distributed network address translation. At step 142, a request is sent from a first network device on a first computer network to a second network device on the first computer network. The request is for a second external network and includes a combination network address identifying the first network device on the first network. The combination network is constructed with method 130 (FIG. 9) and includes a globally unique port and a common external address to identify the first computer network to the second external network. At step 144, the second network device routes the request from the first computer network to the second external network. At step 146, the second network device on the first computer network receives a response from the external second computer network at the external network address identifying the first network from the combination network address. At step 148, the second network device on the first computer network routes the response to the first network device on the first computer network using the globally unique port from the combination network address.

In an illustrative embodiment of the present invention, the first network device is any of network devices (14, 16, 18, 20, 22, 24), the second network device is router 26. The first computer network is SOHO LAN 12, and the second computer network is second computer network 30 or third computer network 32. The combination network address includes a globally unique port obtained with PAP 64 and an external IP 48 address for an external network such as the Internet, an intranet, or another computer network. However, the present invention is not limited to the networks, network devices, network address or protocol described and others may also be used.

Method 140 (FIG.10) is illustrated with a specific example using TCP 58/IP 48 layers from layered protocol stack 42. However, other protocol layers in layered protocol stack 42 could also be used. At step 142, network device 14 sends a TCP 58 request to server 39. For example, a TCP 58 request for server 39 at external IP 48 address 192.200.20.3 on second computer network 30. Table 2 illustrates an exemplary request data packet sent a step 142.

TABLE 2

| IP 48 Header | TCP 58 Header |
|---|---|
| SRC IP: 198.10.20.30 | SRC Port: 2 |
| DST IP: 192.200.20.3 | DST Port: 80 |

The source IP 48 address is common external network address 28 (e.g., 198.10.20.30) and the source port is globally unique port-2 obtained via PAP 64 with method 130 and assigned to TCP 58. In one embodiment of the present invention, globally unique port-2 replaces local port 1234 for TCP 58 when network device 14 was booted. In another embodiment of the present invention, local port 1234 is replaced with a globally unique port such as globally unique port-2 whenever a protocol layer in layered protocol stack makes the request. The globally unique port along with the common external address comprise combination network address 112. In the illustrative example, the default TCP 58 port of 1234 has been replaced with globally unique port-2. The destination IP address is 192.200.20.3 for server 39 (FIG. 1) on second external network 30 and the destination port is well known Internet port 80. When the request reaches a network interface card device driver in link layer 44, in layered protocol stack 42, an outer IP 48 header is added to route the request to router 26. Network interface card device drivers maintain the local internal network address (e.g., 10.0.0.x) for a network device for internal communications. Table 3 illustrates an exemplary data packet with an outer IP 48 header added for router 26.

TABLE 3

| Outer IP 48 header | Inner IP 48 header | TCP 58 header |
|---|---|---|
| SRC IP: 10.0.0.1 | SRC IP: 198.10.20.30 | SRC Port: 2 |
| DST IP: 10.0.0.7 | DST IP: 192.200.20.3 | SRG Port: 80 |

A network interface card device driver adds the outer IP 48 header including a source IP 48 address for network device 14 of 10.0.0.1 and a destination IP 48 address of 10.0.0.7 for router 26. At step 144, router 26 receives the request data packet, strips the outer IP 48 header, and sends the request data packet to external network 30.

At step 146, router 26 receives a response packet from an external network (e.g., 30). An exemplary response data packet is illustrated in Table 4.

TABLE 4

| IP 48 Header | TCP 58 Header |
|---|---|
| SRC IP: 192.200.20.3 | SRC Port: 80 |
| DST IP: 198.10.20.30 | DST Port: 2 |

Router 26 receives the response packet from external second network 30 at step 146 with destination IP 48 address common external network address 198.10.20.30 and destination port set to globally unique port-2. Router 26 uses port-to-internal network address table (FIG. 8) to map destination port-2 to internal IP 48 address 10.0.0.1 for computer 14. Router 26 adds an outer IP 48 header to route the response data packet back to network device 14. Table 5 illustrates an exemplary response packet with outer IP 48 header added by router 26.

TABLE 5

| Outer IP 48 header | Inner IP 48 header | TCP 58 header |
|---|---|---|
| SRC IP: 10.0.0.7 | SRC IP: 192.200.20.3 | SRC Port: 80 |
| DST IP: 10.0.0.1 | DST IP: 198.10.20.30 | SRC Port: 2 |

Outer IP 48 header has a source internal IP 48 address of 10.0.0.7 for router 26 and a destination internal IP 48 address of 10.0.0.1 for network device 14 on computer network 12. At step 148, router 26 routes the response data packet to network device 14 with the outer IP 48 header. A network interface card device driver in link layer 44 in layered protocol stack 42 strips the outer IP 48 header and forwards the response data packet to network layer 46.

Network device 14 sends a request to an external network and receives a response from the external network using DNAT and globally unique port allocated with PAP 64. Router 26 does not translate any source/destination IP 48 addresses or source/destination ports. Thus, DNAT is accomplished without network address translation at router 26.

An illustrative embodiment of the present invention is described with respect to a single common external network address identifying multiple network devices on first computer network 12 and used in combination network address 112 with a globally unique port. However, the present invention is not limited to a single common external network address and can also be practiced with a multiple common external network addresses as long as the number of multiple common external network addresses remains a reasonably small number (e.g., <10).

Distributed network address translation using method 130 (FIG. 9) and method 132 (FIG. 10) removes the computation burden of NAT at router 26 and allows multiple network devices to use a single or a small number of external network addresses known to an external network such as the Internet or an intranet. Instead of providing NAT, router 26 routes data packets from a network device (14, 16, 18, 20, 22, 24) on first computer network 12 to a second external computer network such as second computer network 30 or third computer network 32 using the combination network address. In addition, router 26 is no longer required to support multiple application protocols from layered protocol stack 42.

Router 26 also routes data packets from the second external computer network back to a network device on the first computer network using the globally unique port in the combination network address. Router 26 is no longer required to replace an internal network address with an external network address for outbound traffic, and replace an external network address with an internal network address for inbound traffic. Thus, DNAT of the present invention removes the computational burden of NAT from router 26 and does not violate the Internet principal of providing end-to-end transmission of data packets between network devices without alternations.

DNAT with Port Translation

In another embodiment of the present invention, DNAT is accomplished without modifying protocols or applications in layered protocol stack 42 above link layer 44. However, in such an embodiment, a link layer 44 in network devices (14, 16, 18, 20, 22, 24) is used to translate default or local ports on-the-fly to/from globally unique ports reserved by a network device with PAP 64. In addition, link layer 44 supports multiple protocols from layered protocol stack 42 above link layer 44 for DNAT with port translation.

As an example, suppose computer 14 (FIG. 1) with internal IP 48 address 10.0.0.1 makes a TCP 58/IP 48 request from a server on second computer network 32 (e.g., the Internet) at external IP 48 address 192.200.20.3 (i.e., web server 39, FIG. 1). The initial TCP 58 packet reaching network interface card device driver in link layer 44 of layered protocol stack 42 is illustrated in Table 6.

TABLE 6

| IP 48 Header | TCP 58 Header |
|---|---|
| SRC IP 198.10.20.30 | SRC Port: 1234 |
| DST IP 192.200.20.3 | DST Port: 80 |

The local source port for TCP 58 is 1234, the destination port is well known port 80 for the Internet, the source IP 48 address is common external network address 28 and the destination address is external IP 48 address for server 39 (FIG. 1).

In the illustrative embodiment discussed above using methods 130 and 140 of FIGS. 9 and 10, application and/or protocol local default ports are modified by a network device to use a globally unique port obtained via PAP 64 in protocol layers above link layer 44. However, for DNAT with port translation, ports are not translated in protocol layers above link layer 44 in layered protocol stack 42 are not modified. Network interface card device drivers in link layer 44 instead provide port and address translation. In such an embodiment, a network interface card device driver will determine that a connection is being initiated. An entry in a Source Port Translation Table ("SPTT") in a network interface card device driver is created.

FIG. 11 illustrates a SPTT layout 150. However, other layouts, field sizes and values could also be used. Local-port field 152 is two-bytes and is the port number used by TCP 58 of a network device. Global-port 154 field is two-bytes and is a globally unique port number used for external communications allocated by PAP 64. Protocol-field 156 is one-byte and has a value of zero for TCP 58 and a value of one for UDP 60. Timestamp-field 158 is four-bytes and has a value of a current system time in milliseconds updated every time this entry is used.

TCP 58 source port 1234 is translated into a globally unique port allocated by PAP 64 by a network interface card device driver in link layer 44. TCP 58 source port 1234 is not translated in TCP 58 layer or any other protocol layer above the link layer in layered protocol stack 42. An entry is added to SPTT 150. Table 7 illustrates an exemplary SPTT 150 table entry.

TABLE 7

| Local Port | Globally Unique Port | Protocol | Timestamp |
|---|---|---|---|
| 1234 | 2 | 1 (TCP) | 10023 |

After translation by the network interface card driver, an outer EP 48 header is added to the data packet. The outer IP header is used for routing. The outer IP header has the internal address of the network device as a source IP 48 address (e.g., 10.0.0.1) and the internal network address of router 26 (e.g., 10.0.0.7) as a destination address. Table 8 illustrates the data packet with the

TABLE 8

| Outer IP 48 Header | Inner IP 48 Header | TCP 58 Header |
|---|---|---|
| SRC IP 10.0.0.1 | SRC IP 198.10.20.30 | SRC port 2 |
| DST IP 10.0.0.7 | DST IP 192.200.20.3 | DST port 80 |

Upon receiving the data packet illustrated in Table 4, router 26 examines the source port (e.g., 2) and the outer IP 48 source address (e.g., 10.0.0.1) to ensure a network device is using a valid globally unique port assigned to the network device.

Router 26 maintains an IP Address Translation Table ("IAPTT"). FIG. 12 illustrates a IAPTT layout 160. However, other layouts, field sizes and values could also be used. Destination port-field 162 is two-bytes and holds a globally unique port obtained with PAP 64. Internal destination IP address-field 164 is four-bytes and is the internal IP 48 address (e.g., 10.0.0.1) of a network device using the globally unique port in destination port-field 162. Protocol-field 166 is one-byte and has a value of zero for TCP 58 or a value of one for UDP 60. Timestamp-field 168 is four-bytes and has a value of a current system time in milliseconds updated every time this entry is used. Table 9 illustrates an exemplary IAPTT 160 table entry.

TABLE 9

| Destination Port (globally unique port) | Internal Destination IP 48 Address | Protocol | Timestamp |
|---|---|---|---|
| 2 | 10.0.0.1 | 1 (TCP) | 10048 |

Table 9 illustrates that globally unique port-2 is associated with internal IP 48 address 10.0.0.1 (e.g., computer 14) for TCP 58 protocol.

Router 26 strips off the outer IP 48 header illustrated in Table 8 and sends the data packet comprising the inner IP 48 header and TCP 58 header to external network 30.

A response data packet arrives from an external network on common external network address 28 (e.g., 198.10.20.30). An arriving packet contains the headers illustrated in Table 10.

TABLE 10

| IP 48 Header | TCP Header |
|---|---|
| SRC IP 192.200.20.3 | SRC Port: 80 |
| DST IP 198.10.20.30 | DST Port: 2 |

Router 26 looks up destination port 2 (i.e., globally unique port 2) in IPATT 158 (Table 9) and finds local network address 10.0.0.1 (e.g., computer 14). Router 26 then creates an outer IP 48 header such as the exemplary IP 48 header illustrated in Table 11. The outer IP 48 header has a source IP 48 address for router 26 and a destination IP 48 address for network device 14.

TABLE 11

| Outer IP 48 Header | Inner IP 48 Header | TCP 58 Header |
|---|---|---|
| SRC IP 10.0.0.7 | SRC IP 192.200.20.3 | SRC port 80 |
| DST IP 10.0.0.1 | DST IP 198.10.20.30 | DST port 2 |

Router 26 then transmits the data packet illustrated in Table 11 to the appropriate network device (e.g., computer 14 at internal address 10.0.0.1). Upon receiving the data packet, a network interface card driver looks up the destination port (e.g., 2) in SPTT 148 (e.g., Table 7) finding a mapping to TCP 58 port 1234. Globally unique port-2 is re-translated back to TCP 58 local port 1234 in link layer 44. No translation is done above link layer 44. Outer IP 48 header is stripped. The data packet is forwarded to IP 48 in network layer 46. Table 12 illustrates the forwarded data packet.

TABLE 12

| Inner IP 48 header | TCP 58 header |
|---|---|
| SRC IP 192.200.20.3 | SRC Port 80 |
| DST IP 198.10.20.30 | DST Port 1234 |

The end of the connection is detected by both router 26 and network device 14. Upon end of connection, the entries in the SPTT 148 and IPATT 160 tables are removed from router 26 and network interface card driver.

FIG. 13 illustrates a method 170 for outbound distributed network address translation using port translation. At step 172, a network interface card device driver in link layer 44 receives a data packet from network layer 46 packet (e.g., Table 6). At step 174, the network interface card device driver conducts a test to determine if a destination network address (e.g., 192.200.20.3) is for an external network (e.g., 30 or 32). If so, at step 176, the network interface card device driver adds an outer IP 48 header to the data packet with the source address set to the network device's internal IP 48 address (e.g., 10.0.0.1) and the destination address set to the router 26 internal address (e.g., 10.0.0.7) as (e.g., Table 8). At step 178, a local source port for the application or protocol from the header (e.g., TCP 58 port 1234) is translated into a globally unique port (e.g., 2) obtained via PAP 64 with SPTT 150 (e.g., Table 7). At step 180, the data packet with the outer IP 48 header is transmitted to network interface card hardware, which forwards to data packet to router 26.

If the test at 174 determines that the destination network address is for internal network 12, then at step 182, an outer IP 48 header is added to the data packet with the destination address in the outer IP 48 header copied from the inner IP 48 destination address. The data packet with the outer IP 48 header is transmitted to network interface card hardware, which forwards the data packet to router 26 at step 180. The local or default source port is not translated to a globally unique port for internal communications.

Using method 170, distributed network address translation is done by a network interface card device driver, and no port translation occurs above link layer 44. However, other software or hardware modules or drivers in link layer 44 besides a network interface card device driver could also translate ports with method 170.

FIG. 14 is a flow diagram illustrating a method 184 for inbound distributed network address translation using port translation. At step 186, a data packet is received on a network interface card driver in link layer 44 (e.g., Table 11) from router 26. Router 26 received the data packet from external network 30 or 32 and added an outer IP 48 header. At step 188, a test is conducted to determine if the source IP 48 address from the inner IP 48 header is an external IP 48 address. If so, at step 190 the destination port from the inner IP 48 header is translated from a globally unique port to a local port (e.g., 2→1234) using SPATT 158 (Table 7). At step 192, the outer IP 48 header is stripped off. At step 192, the data packet (e.g., Table 12) is forwarded to network layer 46.

If the test at step 188 determines that the source IP 48 address is for internal network 12, then at step 196 the source IP address from the outer IP 48 header is copied to the inner source IP address. At step 192, the outer IP 48 header is stripped off. At step 194, the data packet is forwarded to network layer 46. The default or local source port is not translated to a globally unique port for internal communications.

Using method 184, distributed network address translation is done by a network interface card device driver, and no port translation occurs above link layer 44. However, other software or hardware modules or drivers in link layer 44 besides a network interface card device driver could also translate ports with method 184.

DNAT (FIG. 9 & FIG. 10) does port translation in individual protocol layers in layered protocol stack 42. The port translation is done at boot time for a network device, or dynamically in a protocol layer when a protocol layer makes a request to an external network (e.g., 30 or 32).

In contrast, DNAT with port translation (FIG. 13 & FIG. 14) does port translation in link layer 44 on a network device. No ports are translated in protocol layers above link layer 44. In addition, link layer 44 supports multiple protocols from layered protocol stack 42 above link layer 44 for DNAT with port translation. For outbound data, a local port assigned to an application or protocol is translated to a globally unique port on-the-fly in link layer 44. For inbound data, the network device translates a globally unique port back to a local port on-the-fly in link layer 44. DNAT with on-the-fly port translation in link layer 44 (FIGS. 13 & 14) places more computational overhead on a network device than DNAT with port translation in individual protocol layers (FIG. 10).

However, DNAT with on-the-fly port translation in link layer 44 (FIGS. 13 & 14) is still preferred over non-distributed NAT in router 26 with methods known in the prior art since computational costs for translation are distributed among a number of network devices and not concentrated in router 26. Router 26 does not translate any addresses for the described embodiments of the present invention.

The various embodiments of the present invention described above offer several advantages over the prior art. Network address translation and the large computational burden is removed from a router and distributed to individual network devices using a port allocation protocol to allocate globally unique ports. A router is no longer required to support multiple individual protocols. DNAT port translation is done on a source and/or destination network device. Thus, DNAT with port translation does not violate the Internet principal that recommends that packets flow and-to-end between network devices without changing the contents of any packet along a transmission route. Illustrative embodiments of the present invention can support multi-casting with a router serving as a proxy for internal network devices that wish to join an existing multicast session. Illustrative embodiments of the present invention can also be used to support Virtual Private Networks ("VPNs").

DNAT also allows a local network to efficiently switch between external network service providers (e.g., Internet service providers) by changing the common external address for an external network assigned to a local network. DNAT also allows a local network to purchase a smaller block of external network addresses, providing a cost savings on the local network.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A computer readable medium having stored therein a set of routines for implementing a port allocation protocol, said protocol allowing a plurality of first network devices on a first network to use globally unique ports in combination with a common external network address to communicate with a plurality of second network devices on a second external network without network address translation, said set of routines implementing said protocol including a plurality of protocol messages and combination network addresses as data bits, the computer readable medium comprising:

a port allocation protocol request message, for requesting allocation of a plurality of globally unique port numbers for a network device;

a port allocation protocol response message, for receiving the plurality of globally unique port numbers for the network device;

a port allocation protocol invalidate message, for de-allocating the plurality of globally unique port numbers allocated to the network device; and a plurality of combination network addresses, having a globally unique port allocated by the port allocation protocol request message and a common external network address to identify a first network to a second external network, and allowing a plurality of first network devices on the first network to communicate with the plurality of second network devices on the second external network without network address translation.

2. The computer readable medium of claim 1 wherein the common external network address includes an Internet Protocol address.

3. The computer readable medium of claim 1 wherein the plurality of protocol messages are used as part of an Internet Control Message Protocol message.

4. A method of distributed network address translation, comprising the following steps:

requesting from a first network device on a first network with a first protocol, one or more globally unique ports from a second network device on the first network to identify the first network device during communications with a second external network;

receiving the one or more globally unique ports on the first network device from the second network device with the first protocol;

replacing a local port on the first network device with a globally unique port;

creating a combination network address for the first network device with the globally unique port and a common external network address to identify the first network device for communications with the second external network.

5. A computer readable medium having stored therein instructions for causing a central processing unit to execute the method of claim 4.

6. The method of claim 4 further comprising:

sending a data packet request from the first network device to the second network device on the first network;

routing the data packet request from the second network device to a third network device on the second external network;

receiving a reply to the data packet request from the third network device on the second external network on the second network device on the first network for the first network device on the common external network address for the first network from the combination network address;

routing the reply to the data packet request from the second network device to the first network device on the first network using the globally unique port from the combination network address.

7. The method of claim 4 wherein the first protocol is a port allocation protocol comprising a port allocation protocol request message, port allocation protocol response message, a port allocation protocol invalidate message, and a combination network address including a globally unique port and a common external network address.

8. The method of claim 4 wherein the common external network address is an Internet protocol address.

9. The method of claim 4 wherein the second network device is any of a router or a port server.

10. The method of claim 4 wherein the first network device is any of a computer, printer, facsimile device, hand-held device, or a telephone.

11. The method of claim 4 wherein the first network is a local area network and the second network is any of the Internet, or intranet or a public switched telephone network.

12. A method of distributed network address translation, comprising the following steps:

requesting with a first protocol from a first network device on a first network, one or more globally unique ports from a second network device on the first network;

receiving the one or more globally unique ports on first network device from the second network device;

creating a request in a higher level protocol layer in a layered protocol stack on the first network device, for a third network device on a second external network, the request including a common network address and a local port on the first network device to identify the first network device on the first network to the second external network;

forwarding the request from the higher level protocol layer to a lower level protocol layer in the first network device;

translating the local port in the request to a globally unique port in the lower level protocol layer on the first network device;

sending the request from the first network device to the second network device; and forwarding the request from the second network device to the third network device on the second external network.

13. A computer readable medium having stored therein instructions for causing a central processing unit to execute the method of claim 12.

14. The method of claim 12 further comprising:

receiving a response on the second network device on the first network on the common network address for the first network from the third network device on the second external network, wherein the response includes the common network address and the globally unique port for the first network device;

forwarding the response from the second network device to the first network device;

translating the globally unique port in the response into the local port for the first network device in the lower level protocol layer on the first network device; and forwarding the response tithe higher level protocol layer on the first network device.

15. The method of claim 12 wherein the first network device is any of a computer, printer, facsimile, hand-held device or a telephone, the second network device is a router, and the first network is a local area network.

16. The method of claim 12 wherein the second network is any of the Internet, an intranet, or a public switched telephone network.

17. The method of claim 12 wherein the common external network address is an Internet Protocol address.

18. The method of claim 12 wherein the first protocol is a port allocation protocol comprising a port allocation protocol request message, port allocation protocol response message, a port allocation protocol invalidate message, and a combination network address including globally unique port and a common external network address.

19. The method of claim 12 wherein the layered protocol stack includes from lowest-to-highest, link, network, transmission and application layers.

20. A method of distributed network address translation, comprising the following steps:

replacing one or more local ports in a layered protocol stack on a first network device on a first network with one or more globally unique ports, wherein the one or more globally unique ports are obtained with a port allocation protocol from a second network device on the first network;

sending data packet requests for a third network device on a second external network from a first layer in the layered protocol stack on the first network device wherein, the data packet requests include a globally unique port and a common external network address in a combination network address, wherein the common external network address identifies network devices on the first network to the external second network;

receiving responses to the data packet requests in the first layer in the layered protocol stack on the first network device from the third network device on the external second network with the common external network address and the globally unique port.

21. A computer readable medium have stored therein instructions for causing a central processing unit to execute the method of claim 20.

22. The method of claim 20 wherein the common network address is an Internet Protocol address.

23. The method of claim 20 wherein the layered protocol stack includes link, network, transmission and application layers.

24. A method for distributed network address translation, comprising the following steps:

creating a request data packet on a first network device on a first network for a third network device on a second external network,
wherein the request data packet includes a data packet header with a common external network address to identify network devices on the first network to other network devices on the second external network and a globally unique port obtained from a second network device on the first network,
wherein the globally unique port uniquely identifies the first network device on the first network, and
wherein the globally unique port is used to replace a local source port on the first network device;

adding an additional request header to the request data packet to create a modified request data packet,
wherein the additional request header includes a first local internal network address for the first network device that identifies the first network device on the first network and a second local internal network address for the second network device that identifies the second network device on the first network; and forwarding the modified request data packet from the first network device to the second network device over the first network.

25. A computer readable medium having stored therein instructions for causing a central processing unit to execute the method of claim 24.

26. The method of claim 24 further comprising:
receiving the modified request data packet on the second network device over the first network;
deleting the additional request header from the modified request data packet to obtain the request data packet; and
forwarding the request data packet from the second network device over the second external network to the third network device.

27. The method of claim 26 further comprising:
receiving a response data packet on the second network device on the first network from the third network device on the second external network for the first network device on the first network on the common external network address for the network devices on the first network,
wherein the response data packet includes the common external network address for the network devices on the first network and the globally unique port to uniquely identify the first network device on the first network;

determining on the second network device with the globally unique port from the response data packet, the first local internal network address that identifies the first network device on the first network;

adding an additional response header to the response data packet to create a modified response data packet,
wherein the additional response header includes the determined first local internal network address for the first network device that identifies the first network device on the first network and the second local internal network address for the second network device that identifies the second network device on the first network;

forwarding the modified response data packet from the second network device to the first network device over the first network.

28. The method of claim 27 further comprising:
receiving the modified response data packet on the first network device on the first network; and
deleting the additional response header from the modified response data packet to obtain the response data packet.

29. The method of claim 28 further comprising:
replacing the globally unique port from the response data packet with a local source port for use on the first network device.

30. The method of claim 24 wherein the first local internal network address and the second local internal network address are local internal network addresses that cannot be used on the second external network.

31. The method of claim 24 wherein the first local internal network address and the second local internal network address are local internal Internet Protocol addresses.

32. The method of claim 24 wherein the common external network address is a common external Internet Protocol address.

33. The method of claim 24 wherein the local source port is a Transmission Control Protocol port or a User Datagram Protocol port.

34. A method for distributed network address translation, comprising the following steps:

creating a request data packet on a first network device on a local network for a third network device on the Internet,
wherein the request data packet includes a data packet header with a common external Internet Protocol address to identify network devices on the local network to other network devices on the Internet and a globally unique port obtained from a router on the local network,
wherein the globally unique port uniquely identifies the first network device on the local network, and wherein the globally unique port is used to replace a local source port on the first network device;

adding an additional request header to the request data packet to create a modified request data packet, wherein the additional request header includes a first local internal Internet Protocol address for the first network device that identifies the first network device on the local network and a second local internal Internet Protocol address for the router that identifies the router on the local network; and forwarding the modified request data packet from the first network device to the router over the local network.

35. A computer readable medium having stored therein instructions for causing a central processing unit to execute the method of claim 34.

36. The method of claim 34 further comprising:

receiving the modified request data packet on the router over the local network;

deleting the additional request header from the modified request data packet to obtain the request data packet; and forwarding the request data packet from the router over the Internet to the third network device.

37. The method of claim 36 further comprising:

receiving a response data packet on the router on the local network from the third network device on the Internet for the first network device on the local network on the common external Internet Protocol address for the network devices on the local network, wherein the response data packet includes the common external Internet Protocol address for the network devices on the local network and a globally unique port to uniquely identify the first network device on the local network;

determining on the router with the globally unique port from the response data packet, the first local internal Internet Protocol address that identifies the first network device on the first network;

adding an additional response header to the response data packet to create a modified response data packet, wherein the additional response header includes the determined first local internal Internet Protocol address for the first network device that identifies the first network device on the local network and the second local internal Internet Protocol address for the router that identifies the router on the local network;

forwarding the modified response data packet from the router to the first network device over the local network.

38. The method of claim 37 further comprising:

receiving the modified response data packet on the first network device on the local network; and deleting the additional response header from the modified response data packet to obtain the response data packet.

39. The method of claim 38 further comprising:

replacing the globally unique port from the response data packet with a local source port for use on the first network device.

40. The method of claim 34 wherein the first local internal Internet Protocol address and the second local internal Internet Protocol address are local internal Internet Protocol addresses that cannot be used on the Internet.

41. The method of claim 34 wherein the first local internal Internet Protocol address and the second local internal Internet Protocol address are local internal Internet Protocol addresses with a format 10.x.y.z, wherein x, y and z each comprise positive whole numbers between zero and 255.

42. The method of claim 34 wherein the local source port is a Transmission Control Protocol port or a User Datagram Protocol port.

* * * * *

UNITED STATES PATENT AND TRADEMARK OFFICE
CERTIFICATE OF CORRECTION

PATENT NO. : 6,353,614 B1
DATED : March 5, 2002
INVENTOR(S) : Michael S. Borella, David Grabelsky, Ikhlaq Sidhu and Brian D. Petry It is certified that error appears in the above-identified patent and that said Letters Patent is hereby corrected as shown below:

<u>Title page,</u>
Item [56], insert the following:
-- [56] References Cited, U.S. PATENT DOCUMENTS
   6,269,099    07/2001      Borella et al. --.

Signed and Sealed this

Tenth Day of September, 2002

*Attest:*

JAMES E. ROGAN
*Attesting Officer*     *Director of the United States Patent and Trademark Office*